(12) United States Patent
Thompson et al.

(10) Patent No.: US 8,959,564 B2
(45) Date of Patent: Feb. 17, 2015

(54) METHOD FOR CREATING INTERACTIVE APPLICATIONS FOR TELEVISION

(75) Inventors: Matthew J. Thompson, Torrance, CA (US); Edgar C. Camacho, Torrance, CA (US); Manohar S. Gandla, Los Angeles, CA (US); Surya P. Dasi, Torrance, CA (US); Floyd Smith, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 287 days.

(21) Appl. No.: 13/183,246

(22) Filed: Jul. 14, 2011

(65) Prior Publication Data

US 2012/0019724 A1 Jan. 26, 2012

Related U.S. Application Data

(60) Provisional application No. 61/367,322, filed on Jul. 23, 2010.

(51) Int. Cl.
| | | |
|---|---|---|
| *H04N 7/173* | (2011.01) | |
| *H04N 5/445* | (2011.01) | |
| *H04N 21/443* | (2011.01) | |
| *H04N 21/472* | (2011.01) | |
| *H04N 21/8545* | (2011.01) | |
| *H04N 21/431* | (2011.01) | |
| *H04N 21/4725* | (2011.01) | |
| *H04N 21/858* | (2011.01) | |

(52) U.S. Cl.
CPC ............... *H04N 5/445* (2013.01); *H04N 7/173* (2013.01); *H04N 21/443* (2013.01); *H04N 21/47205* (2013.01); *H04N 21/8545* (2013.01); *H04N 21/431* (2013.01); *H04N 21/4312* (2013.01); *H04N 21/4725* (2013.01); *H04N 21/858* (2013.01)
USPC .......................................... 725/131; 348/584

(58) Field of Classification Search
USPC ........................................ 345/589; 725/173
See application file for complete search history.

(56) References Cited

U.S. PATENT DOCUMENTS

2004/0227768 A1* 11/2004 Bates et al. .................. 345/589
2008/0092170 A1    4/2008 Shannon et al.

FOREIGN PATENT DOCUMENTS

WO        02/17639 A2    2/2002

OTHER PUBLICATIONS

International Search Report and Written Opinion dated Aug. 19, 2011 in International Application No. PCT/US2011/043550 filed Jul. 11, 2011.

(Continued)

*Primary Examiner* — Jefferey Harold
*Assistant Examiner* — Sihar Karwan

(57) ABSTRACT

Methods, apparatuses, and systems for creating an overlay application for use within a broadcast communications system are disclosed. A method in accordance with one or more embodiments of the present invention comprises collecting image data from a computer network, generating at least one selectable area within the image data, associating a function with the at least one selectable area, and selectively displaying the image data on a monitor simultaneously with a broadcast data stream, wherein selection of the at least one selectable area executes the associated function.

12 Claims, 11 Drawing Sheets

(56) References Cited

OTHER PUBLICATIONS

Opentv; "OpenAuthor, Overview, Technical White Paper"; internet citation; Jul. 1998; XP002090104; retrieved from the Internet: URL:http://www.opentv.com/openauthorwp.pdf [retrieved Jul. 1, 1998].

Oh, Seungtaek; Yi, Yung; Jeong, Seunghoon; Choi, Yanghee; "Experiments with MHEG Player/Studio: An Interactive Hypermedia Visualization and Authoring System"; Proceedings of the Euromicro Conference; vol. 2; Aug. 25, 1998; pp. 610-615; XP002175925.

Vazirgiannis, M.; Trafalis, M.; Stamati, I.; Hatzopoulos, M.; "i-Mu. S.E.-Interactive Multimedia Scenario Editor"; Proceedings of International Workshop on Multimedia Database Management; Aug. 5, 1998; pp. 145-152; XP002133064.

\* cited by examiner

FIG. 6  BUTTON DEFINITION SCREEN 600

METHOD FOR CREATING INTERACTIVE APPLICATIONS FOR TELEVISION

CROSS-REFERENCE TO RELATED APPLICATIONS

This application claims the benefit of 35 U.S.C. §119(e) of U.S. Application Ser. No. 61/367,322, filed on Jul. 23, 2010, by Matthew J. Thompson et al., entitled "METHOD FOR CREATING INTERACTIVE APPLICATIONS FOR TELEVISION," which application is incorporated by reference herein.

FIELD OF THE DISCLOSURE

The present disclosure relates generally to media presentation systems and, more particularly, to the use of interactive applications for television.

BACKGROUND

Satellite television delivery systems, and other media presentation systems, have become commonplace. Such systems typically include a user interface, usually controlled through a remote control, to assist a user in searching through available content, manipulating features of the media presentation system, or ordering programs for pay-per-view or download.

Typically, the user interface is implemented in a series of menus, lists, and/or guides that are presented on the monitor of such a system. The elements of the user interface may indicate what programs, movies, music, or other events are scheduled for broadcast at certain times, which programs are scheduled for downloading, the contents of a queue, etc. The user may manipulate such a guide to determine upcoming or current programming by moving a cursor through the guide via a remote control or another similar input device. Further, elements of the guide may be selected to tune to programs or events, where the user may determine the status (e.g., a sports score, the weather, a stock price, etc.) of the program or a related event from the broadcast program itself (e.g., determining a sports score by listening to an announcer). Such a status may not be immediately obtainable if, for example, the broadcast program is at commercial.

Other interfaces are also available, such as interfacing with the system via the internet and controlling a receiver, recorder, or other device using a computer. Scheduling of shows, recording of programs, and other actions can be taken via the computer interface as well as via the remote control.

Since the programming choices have become more complex, users expect to see additional features for content delivery.

SUMMARY OF THE INVENTION

To minimize the limitations in the prior art, and to minimize other limitations that will become apparent upon reading and understanding the present specification, the present invention discloses methods, apparatuses, and systems for creating an overlay application for use within a broadcast communications system. A method in accordance with one or more embodiments of the present invention comprises collecting image data from a computer network, generating at least one selectable area within the image data, associating a function with the at least one selectable area, and selectively displaying the image data on a monitor simultaneously with a broadcast data stream, wherein selection of the at least one selectable area executes the associated function.

Such a method further optionally comprises the associated function comprising retrieving a new image data from the computer network, saving the image data and associated function as an application in a publicly accessible database, restricting access to the saved image data and associated function, and the associated function comprising performing a function on a set-top box.

An apparatus for displaying a broadcast data stream and a user-created overlay application on a monitor in a broadcast communications system in accordance with one or more embodiments of the present invention comprises a receiver, an overlay application controller, coupled to the receiver, a storage device, coupled to the overlay application controller and the receiver, a network interface, coupled to the controller and the receiver, and a user interface, coupled to the controller, wherein at least one user-created overlay application is selected via the user interface, the at least one user-created overlay application comprising image data selected from a computer network and a function associated with at least one selectable area within the image data, wherein the at least one user-created overlay application is selectively displayed simultaneously with the broadcast data stream on the monitor.

Such a system further optionally comprises the associated function comprises retrieving a new image data from the computer network, saving the image data and associated function as an application in a publicly accessible database, restricting access to the saved image data and associated function, the associated function comprising performing a function on a set-top box, the user-created overlay application being created on a computer, and the user-created overlay application being created on a user account associated with the broadcast communication system.

A system for displaying a broadcast data stream and a user-created overlay application on a monitor in a broadcast communications system in accordance with one or more embodiments of the present invention comprises a transmission system for transmitting a plurality of broadcast data streams, a network interface, a receiver for receiving the plurality of broadcast data streams from the transmission system and at least one user-created overlay application from the network interface, an overlay application controller, coupled to the receiver, for executing the plurality of user-created overlay applications, and a user interface, coupled to the receiver, wherein at least one user-created overlay application is selected via the user interface, the at least one user-created overlay application comprising image data selected from a computer network and a function associated with at least one selectable area within the image data, wherein the at least one user-created overlay application is selectively displayed simultaneously with the broadcast data stream on the monitor.

Such a system further optionally comprises the associated function comprising retrieving a new image data from the computer network, saving the image data and associated function as an application in a publicly accessible database, restricting access to the saved image data and associated function, and the associated function comprising performing a function on a set-top box.

Other features and advantages are inherent in the system disclosed or will become apparent to those skilled in the art from the following detailed description and its accompanying drawings.

DETAILED DESCRIPTION

The example overlay applications and associated methods for use in a media presentation system (e.g., a home entertainment system including a media signal decoder and a television) described herein may be implemented in connection with any type of media broadcasting system including, for example, satellite broadcast systems, cable broadcast systems, radio frequency wave broadcast systems, etc.

By way of illustration, an example broadcast system is described below in connection with FIG. 1 and an example receiver (e.g., set-top-boxes, broadcast signal decoders, etc.) is described in detail below in connection with FIG. 2. Further, while the following disclosure is made with respect to example DIRECTV® services and systems, it should be understood that many other delivery systems are readily applicable to the described methods and apparatus. Such systems include wired or cable distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), and/or fiber optic networks.

System Architecture

Figure 1:
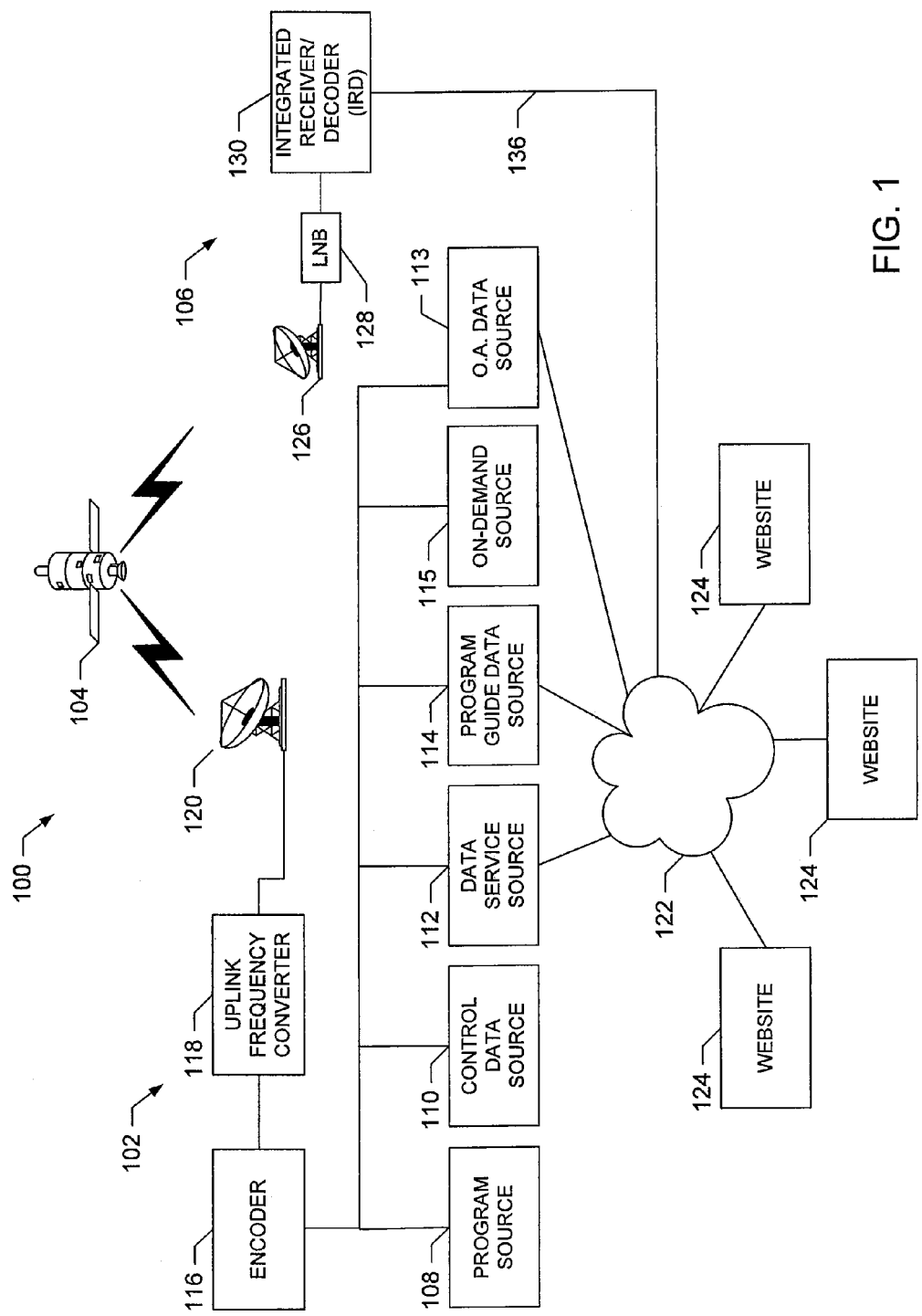
FIG. 1 is a diagram of an example direct-to-home (DTH) transmission and reception system.

As illustrated in FIG. 1, an example direct-to-home (DTH) system 100 generally includes a transmission station 102, a satellite/relay 104 and a plurality of receiver stations, one of which is shown at reference numeral 106, between which wireless communications are exchanged. The wireless communications may take place at any suitable frequency, such as, for example, Ku-band frequencies. As described in detail below with respect to each portion of the system 100, information from the transmission station 102 is transmitted to the satellite/relay 104, which may be at least one geosynchronous or geo-stationary satellite that, in turn, rebroadcasts the information over broad geographical areas on the earth that include receiver stations 106. To facilitate backchannel communications, the receiver stations 106 may be communicatively coupled to the transmission station 102 via a terrestrial communication link, such as a telephone line and/or an Internet connection 136. The Internet connection 136 may also facilitate other general data transfers, such as requests and responses to and from one or more servers of a network 122 and the receiver stations 106.

In further detail, the example transmission station 102 of the example system of FIG. 1 includes a plurality of sources of data and/or information (e.g., program sources 108, a control data source 110, a data service source 112, an overlay application data source 113, one or more program guide data sources 114, and an on-demand source 115). During operation, information from one or more of these sources 108, 110, 111, 112, 114, and 115 passes to an encoder 116, which encodes the information for broadcast to the satellite/relay 104. Encoding includes, for example, converting the information into data streams that are multiplexed into a packetized data stream or bitstream using any of a variety of algorithms. A header is attached to each data packet within the packetized data stream to facilitate identification of the contents of the data packet. The header also includes a service channel identifier (SCID) that identifies the data packet. This data packet is then encrypted. As will be readily appreciated by those having ordinary skill in the art, a SCID is one particular example of a program identifier (PID).

To facilitate the broadcast of information, the encoded information passes from the encoder 116 to an uplink frequency converter 118 that modulates a carrier wave with the encoded information and passes the modulated carrier wave to an uplink antenna 120, which broadcasts the information to the satellite/relay 104. Using any of a variety of techniques, the encoded bitstream is modulated and sent through the uplink frequency converter 118, which converts the modulated encoded bitstream to a frequency band suitable for reception by the satellite/relay 104. The modulated, encoded bitstream is then routed from the uplink frequency converter 118 to the uplink antenna 120 where it is broadcast toward the satellite/relay 104.

The programming sources 108 receive video and audio programming from a number of sources, including satellites, terrestrial fiber optics, cable, or tape. The video and audio programming may include, but is not limited to, television programming, movies, sporting events, news, music or any other desirable content.

Like the programming sources 108, the control data source 110 passes control data to the encoder 116. Control data may include data representative of a list of SCIDs to be used during the encoding process, or any other suitable information.

The data service source 112 receives data service information and web pages made up of text files, graphics, audio, video, software, etc. Such information may be provided via the network 122. In practice, the network 122 may be the Internet, a local area network (LAN), a wide area network (WAN) or a conventional public switched telephone network (PSTN). The information received from various sources is compiled by the data service source 112 and provided to the encoder 116. For example, the data service source 112 may request and receive information from one or more websites 124. The information from the websites 124 may be related to the program information provided to the encoder 116 by the program sources 108, thereby providing additional data related to programming content that may be displayed to a user at the receiver station 106.

The overlay application data source 113 receives and stores data to be transmitted to and used by the example overlay applications described herein, which provide a user with information (e.g., via the overlay application controller 240 of FIG. 2) information regarding, for example, a current event, a program, or a status of a device or component of a media presentation system. Further, in some examples, the overlay application data source 113 may store a collection of overlay applications to be downloaded by the user to the media presentation device (e.g., a set-top box).

Similar to the data service source 112, the overlay application data source 113 may gather data (e.g., stock prices, sports scores, news, weather reports, etc.) from a plurality of servers or other databases via the Internet or other network. Such transfers of information may be carried out using standard network protocols (e.g., HTTP, FTP, TCP/IP, etc.). In some examples, the provider of the transmission system 100 (e.g., DIRECTV®) may transmit data to the overlay application data source 113 via internal sources (e.g., a server including promotion or notification information regarding the transmission system 100). Further, where an overlay application was provided (e.g., created and made available to the user) by a third party (e.g., a television programming provider), the overlay application data source 113 may receive data directly from a server dedicated to provide information related to the third party or programming provided by the third party.

The contents of the overlay application data source 113 may be conveyed to the receiver station 106 in any of a variety of methods (e.g., similar to the transfer of data between the data source 112 and the receiver station 106). For example, the overlay application data source 113 may stream data to the receiver station 106 periodically, continuously (e.g., in a one-way push communication), or upon a request from the receiver station 106 (e.g., in a push-pull communication) via a local controller (e.g., the overlay application controller 240 described below in connection with FIG. 2). Additionally or alternatively, the overlay application data source 113 may send data to the overlay applications (e.g., which are located on the memory of a set-top box) over the network 122 (e.g., via the Internet connection 136 of FIG. 1) using standard network protocols.

The overlay application data source 113, which may be coupled to the network 122 and/or the other sources of FIG. 1, is one possible source of data for the overlay applications. Additionally or alternatively, the overlay applications may receive data directly from the network 122 (e.g., from a third party database without accessing the overlay application data source 113). In other words, the overlay applications may include the capability to retrieve or receive data from various servers over the network 122. For example, an overlay application may request data from a news agency database located on a server of the network 122, which may return data (e.g., headlines associated with a list of top news stories) related to the request. In some examples, the overlay applications may receive data from the media presentation device (e.g., the IRD 130) on which they are implemented. For example, an overlay application may request and acquire information regarding an amount of available space on a hard disk used to store on-demand programming.

The program guide data source 114 compiles information related to the SCIDs used by the encoder 116 to encode the data that is broadcast. For example, the program guide data source 114 includes information that the receiver stations 106 use to generate and display a program guide to a user, wherein the program guide may be a grid guide that informs the user of particular programs that are available on particular channels at particular times. The program guide also includes information that the receiver stations 106 use to assemble programming for display to the user. For example, if the user desires to watch a baseball game on his or her receiver station 106, the user will tune to a channel on which the game is offered. The receiver station 106 gathers the SCIDs related to the game, wherein the program guide data source 114 has previously provided to the receiver station 106 a list of SCIDs that correspond to the game. Such a program guide may be manipulated via an input device (e.g., a remote control). For example, a cursor may be moved to highlight a program description within the guide. A user may then select a highlighted program description via the input device to navigate to associated content (e.g., an information screen containing a summary of a television show episode) or active an interactive feature (e.g., a program information screen, a recording process, a future showing list, etc.) associated with an entry of the program guide.

The on-demand (OD) source 115 receives data from a plurality of sources, including, for example, television broadcasting networks, cable networks, system administrators (e.g., providers of the DTH system 100), or other content distributors. Such content may include television programs, sporting events, movies, music, and corresponding information (e.g., user interface information for OD content) for each program or event. The content may be stored (e.g., on a server) at the transmission station 102 or locally (e.g., at a receiver station 106), and may be updated to include, for example, new episodes of television programs, recently released movies, and/or current advertisements for such content. Via a user interface, which also may be updated periodically, a user (e.g., a person with a subscription to an OD service) may request (i.e., demand) programming from the OD source 115. The system 100 may then stream the requested content to the user (e.g., over the satellite/relay 104 or the network 122) or make it available for download and storage (discussed further below in connection with FIG. 2). Thus, an OD service allows a user to view, download, and/or record selected programming at any time.

The satellite/relay 104 receives the modulated, encoded Ku-band, Ka-band, or other electromagnetic or optical bitstream and re-broadcasts it downward toward an area on earth that includes the receiver station 106. In the illustrated example of FIG. 1, the example receiver station 106 includes a reception antenna 126 connected to a low-noise-block (LNB) 128 that is further connected to an integrated receiver/decoder (IRD) 130. The IRD 130 may be a set-top box, a personal computer (PC) having a receiver card installed therein, or any other suitable device.

The receiver station 106 may also incorporate a connection 136 (e.g., Ethernet circuit or modem for communicating over the Internet) to the network 122 for transmitting requests and other data back to the transmission station 102 (or a device managing the transmission station 102 and overall flow of data in the example system 100) and for communicating with websites 124 to obtain information therefrom.

In operation of the receiver station 106, the reception antenna 126 receives signals including a bitstream from the satellite/relay 104. The signals are coupled from the reception antenna 126 to the LNB 128, which amplifies and, optionally, downconverts the received signals. The LNB output is then provided to the IRD 130.

Receiver Overview

Figure 2:
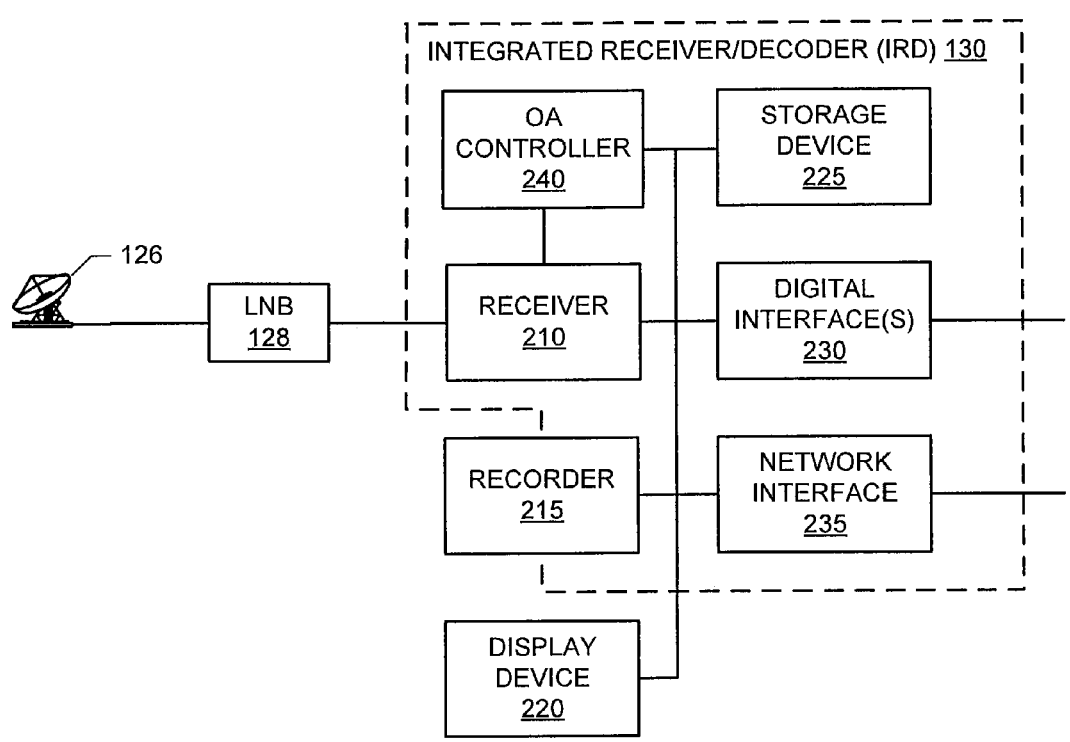
FIG. 2 illustrates an embodiment in accordance with one or more embodiments of implementing an integrated receiver/decoder (IRD) of FIG. 1 with the present invention.

FIG. 2 illustrates one example manner of implementing the IRD 130 (e.g., a set-top box) of FIG. 1. The IRD 130 of FIG. 2 is merely an example and other IRD implementations are possible. The LNB output is provided to a receiver 210, which receives, demodulates, de-packetizes, de-multiplexes, decrypts and/or decodes the received signal to provide audio and video signals to a display device 220 (e.g., a television set or computer monitor) and/or a recorder 215. The receiver 210 is responsive to user inputs to, for example, tune to a particular program.

As illustrated in FIG. 2, the recorder 215 may be implemented separately from and/or within the IRD 130. The recorder 215 may be, for example, a device capable of recording information on a storage device 225, for instance, analog media such as videotape, or computer readable digital media such as a hard disk drive, a digital versatile disc (DVD), a compact disc (CD), flash memory, and/or any other suitable media. The storage device 225 is used to store the packetized assets and/or programs received via the satellite/relay 104 (e.g., a movie requested from the OD source 115). In particular, the packets stored on the storage device 225 are the same encoded and, optionally, encrypted packets created by the transmission station 102 and transmitted via the satellite/relay 104.

To communicate with any of a variety of clients, media players, etc., the example IRD 130 includes one or more digital interfaces 230 (e.g., USB, serial port, Firewire, etc.). To communicatively couple the example IRD 130 to, for instance, the Internet and/or a home network, the example IRD 130 includes a network interface 235 that implements, for example, an Ethernet interface.

Further, the example IRD 130 includes an example overlay application controller 240 to manage and/or operate a collection of overlay applications that may be executed to display information (e.g., a graphical representation of data related to current events or devices related to the corresponding overlay application) on or in connection with, for example, an element of a user interface (e.g., a program guide) or over broadcast media. Additionally, the overlay application controller 240 may enable the user to select, configure, and/or customize one or more overlay applications and a presentation thereof.

In some examples, the overlay application controller 240 stores the user-defined collection of overlay applications (e.g., in local memory of the IRD 130). In some examples, the overlay application controller 240 may manage a default set of overlay applications created and/or stored (e.g., on the local memory of the IRD 130) by a content delivery system provider (e.g., DIRECTV®). In some examples, a broader collection of available overlay applications may be stored on an external source (e.g., the overlay application data source 113 or a third party server coupled to the network 122) in communication with the overlay application controller 240. As described herein, the broader collection of available overlay applications may be accessed via a website, which may be associated with a user account, to enable the user to select additional overlay applications for a collection. Generally, the user may login (e.g., by entering a username and password into input fields of the website) to the account and manage (e.g., modify which overlay applications to include in the collection presented to the user for a selection of which overlay applications to execute) the settings, contents, and/or configurations of the overlay applications.

As described above, the example overlay application controller 240 may send and/or receive data to and/or from various sources (e.g., the overlay application data source 113) via various components (e.g., the network interface 235, the display device 220, the LNB 128) of the transmission system 100 to implement the presentation and/or operation of the overlay applications and information associated therewith. The overlay applications may receive streaming information in a push communication scheme or periodically in a push-pull communication scheme. In some examples, only a select number of overlay applications may be active at a given time. In other words, the user may define a subset of the collection of overlay applications as active or executing. Accordingly, the overlay application controller 240 may refuse (e.g., block) to accept any data related to inactive overlay applications, thereby increasing efficiency, available bandwidth, and memory space. Such an operation may be facilitated by, for example, setting a designated bit as high for active overlay applications to indicate that data may be received.

The example overlay applications described herein are applications (e.g., applets or widgets) that present a user (e.g., via an overlay) with dynamic and/or substantially live information associated with, for example, a current event, a program, or a status of an element of the media presentation system on which the overlay applications are implemented.

An example overlay application may convey information associated with local weather, sports scores, stock market data, ski reports, airline flight information, currently popular television shows or movies, a time until the start of a certain program, a list of programs currently being watched by other users, etc. Additionally or alternatively, the overlay applications may present the user with information associated with the media presentation system, such as an amount of available hard disk space, the amount of recorded programs in a playlist, the next program scheduled for recording or downloading, etc.

Further, overlay applications may be displayed individually, in a list format, on an overlay application homepage or menu dedicated to the overlay application feature, or in any other configuration as determined by a user, a provider of the overlay applications (e.g., a content provider), or a content delivery system provider (e.g., DIRECTV®).

Hardware Environment for Creating Applications

Figure 3:
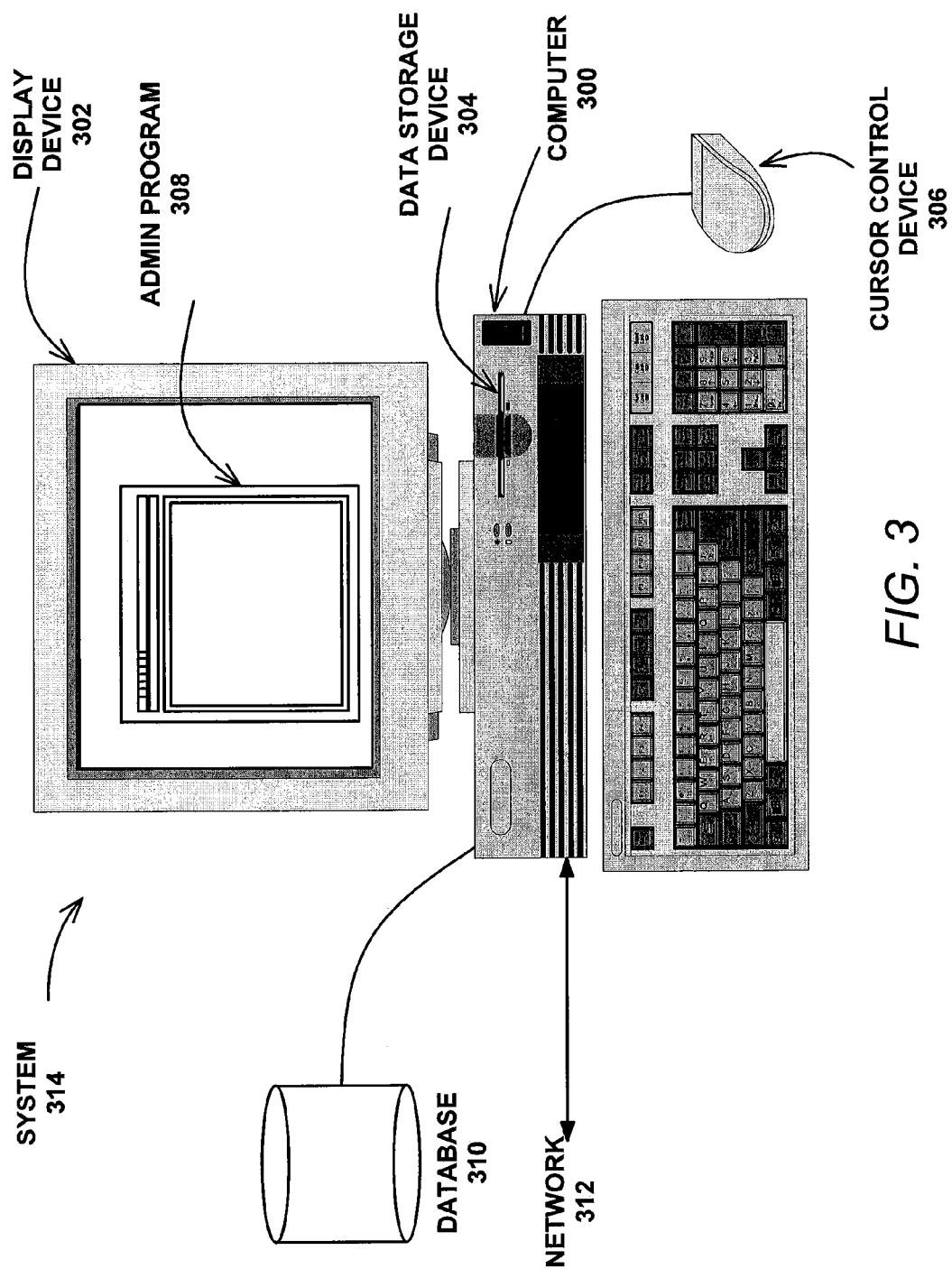
FIG. 3 is an exemplary hardware and software environment used to implement one or more embodiments of the invention.

FIG. 3 is an exemplary hardware and software environment used to implement one or more embodiments of the invention.

Embodiments of the invention are typically implemented using a computer 300, which generally includes, inter alia, a display device 302, data storage devices 304, cursor control devices 306, and other devices. Those skilled in the art will recognize that any combination of the above components, or any number of different components, peripherals, and other devices, may be used with the computer 100.

Generally, the admin program 308 comprises logic and/or data embodied in or readable from a device, media, carrier, or signal, e.g., one or more fixed and/or removable data storage devices 304 connected directly or indirectly to the computer 300, one or more remote devices coupled to the computer 300 via a data communications device, etc. Further, the admin program 308 may utilize a database 310 such as a spatial database.

Computer 300 may also be connected to other computers 300 (e.g., a client or server computer) via network 312 comprising the Internet, LANs (local area network), WANs (wide area network), or the like. Further, database 310 may be integrated within computer 300 or may be located across network 312 on another computer 300 or accessible device.

Those skilled in the art will recognize that the exemplary environment illustrated in FIG. 3 is not intended to limit the present invention. Indeed, those skilled in the art will recognize that other alternative environments may be used without departing from the scope of the present invention.

Creating Applications

FIGS. 4-8 illustrate creation of the overlay applications in accordance with one or more embodiments of the present invention.

Figure 4:
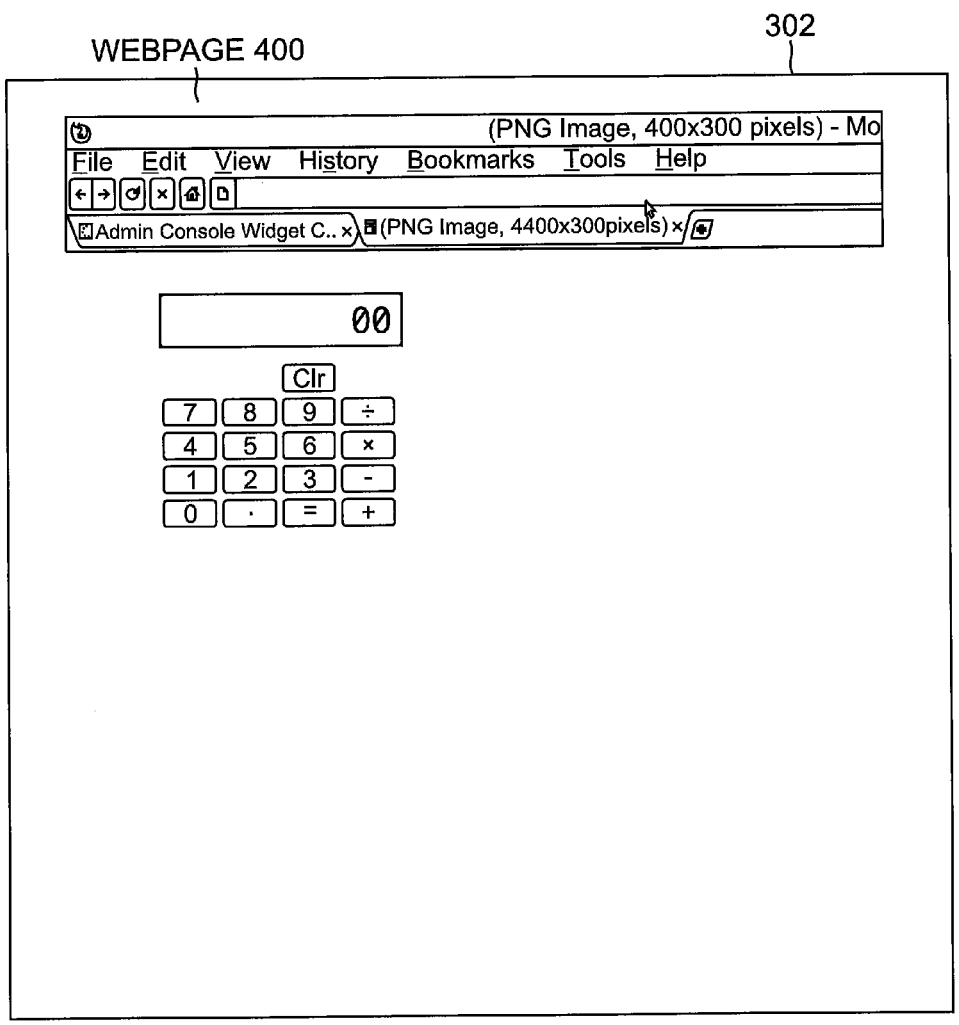
FIGS. 4-8 illustrate creation of the overlay applications in accordance with one or more embodiments of the present invention.

FIG. 4 illustrates a webpage 400 displayed on display device 302. Webpage 400 of the present invention is typically accessed via admin program 308, which is typically a user account tied to reception of DBS services, and allows users to create a personalized overlay application to be displayed on display device 220.

Webpage 400 is typically an image, e.g., a png file, that is desired by a user to be displayed on display device 220. Webpage 400 can be, however, a animated image, video window, or other web-based or other data file as desired.

In the example of FIG. 4, the image is that of a calculator, which includes digits 0-9, a decimal point, arithmetic functions, and a "clear" function, along with a display. The image of webpage 400, within the scope of the present invention, will have portions of the image, e.g., the digits 0-9, the decimal point, etc., defined by the user as having a specific function and specific sections of the image can then be selected by the user via a remote control while viewing the display device 220.

Figure 5:
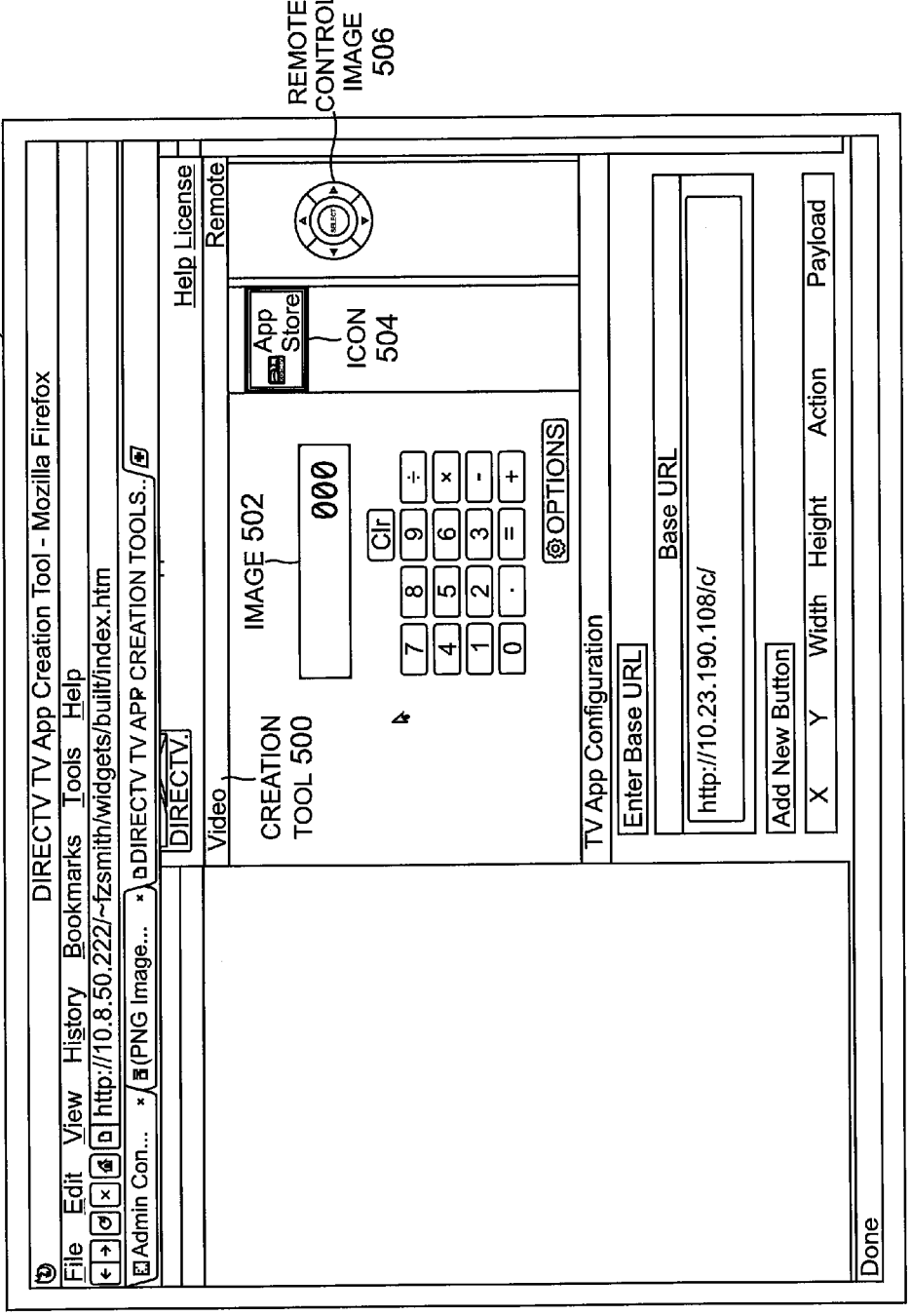

Once the desired image, namely, the image of webpage 400, has been found and selected by the user, the user then enters the Uniform Resource Locator (URL) of the webpage into another section of admin program 308 as shown in FIG. 5.

Section 500 of admin program 308 is the "creation tool" 500 which allows a user to view the image 502 from webpage 400. The user, or other creator, then uses cursor control device 306, or other input devices to computer 300, to define areas on image 502 that will create "buttons" or other selectable areas within image 502, such that when such areas are selected within image 502 via a remote control or other input device to IRD 130, that the overlay application performs a user defined function. Section 500 of the program can be part of or separate from admin program 308 as desired.

To assist in this creation, a remote control image 506 is displayed in section 500, such that the user can use cursor control device 306 to "click" on the cursor buttons and the "select" button on remote control image 506 to see how the defined areas on image 502 will react when displayed on display device 220.

Figure 6:
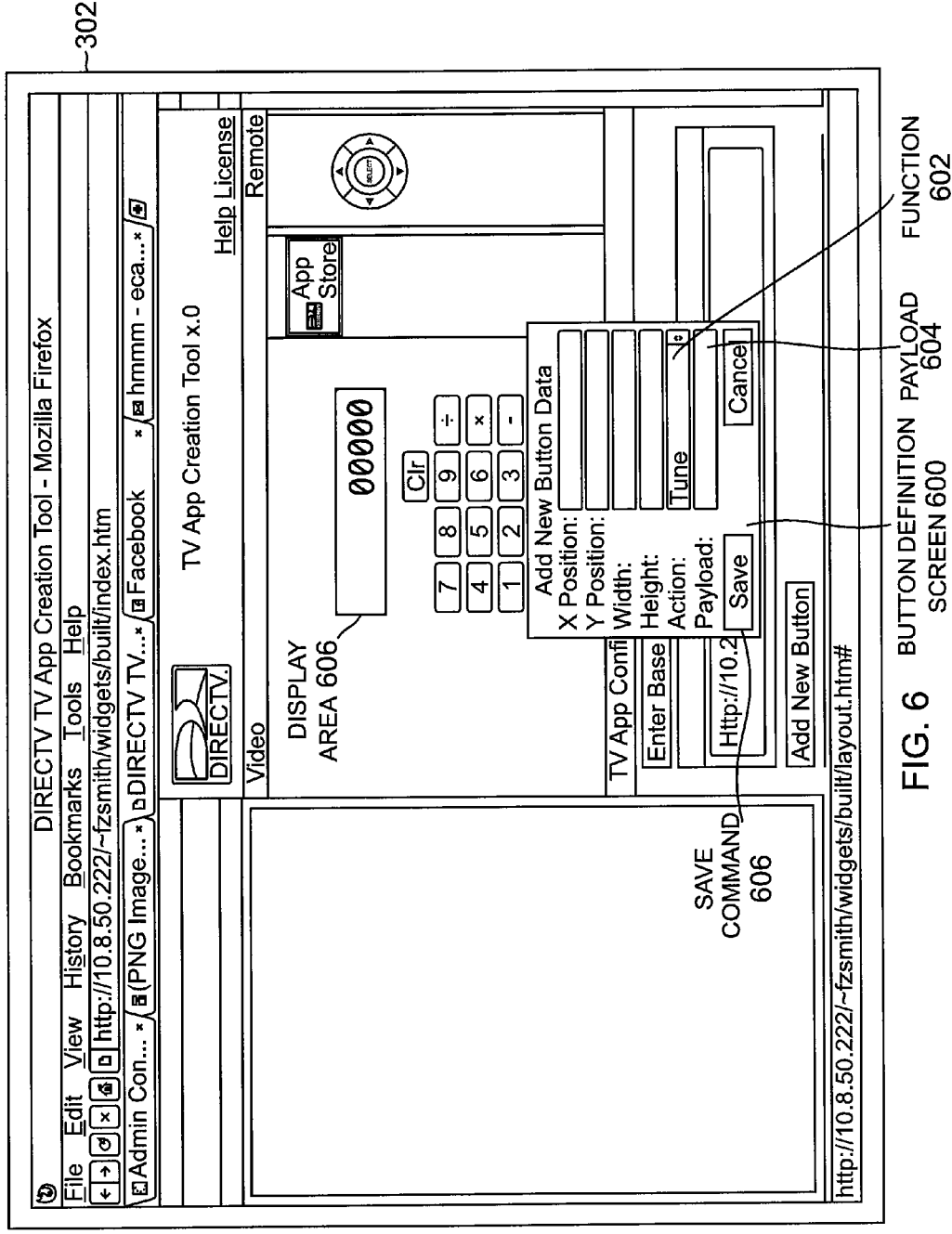

FIG. 6 illustrates defining functions on a selected image in accordance with one or more embodiments of the present invention.

Button definition screen 600 is activated by admin program 308 as the user/creator selects areas within image 502, whether with cursor control device 306 or via other inputs to computer 300, as specific areas are defined within image 400 to create selectable areas of image 400 that are then tied to specific desired functions for manipulation of overlay applications created in accordance with one or more embodiments of the present invention.

As the specific areas are defined in image 400, e.g., the area of each of the digits 0-9, etc., admin program 308, via definition screen 600, allows the creator to specify the function 602 and payload 604 associated with selection of that area of image 400. For example, and not by way of limitation, if the selected area of image 400 is the area associated with the digit "7" in image 400, then the user can define function 602 as "retrieve a new web page" and the payload 604 would be the URL of the desired web page, which would be an image of a "7" that is then displayed as part of image 400 in the "display" area 606 of image 400. So, when the specific area of image 400 associated with the digit "7" is selected, the created application will retrieve another web image at another URL (that of the "7") and display that on the overlay application when displayed on display device 220 (or display device 302 during construction of the overlay application). As each area of image 400 are defined, different functions 602 and payloads 604 are associated with each given area of image 400, to create the interactive overlay application. Each area of image 400, once defined, is then saved via selection of save command 606, which indicates to admin program 308 that the user/creator is done with that particular button creation.

Figure 7:
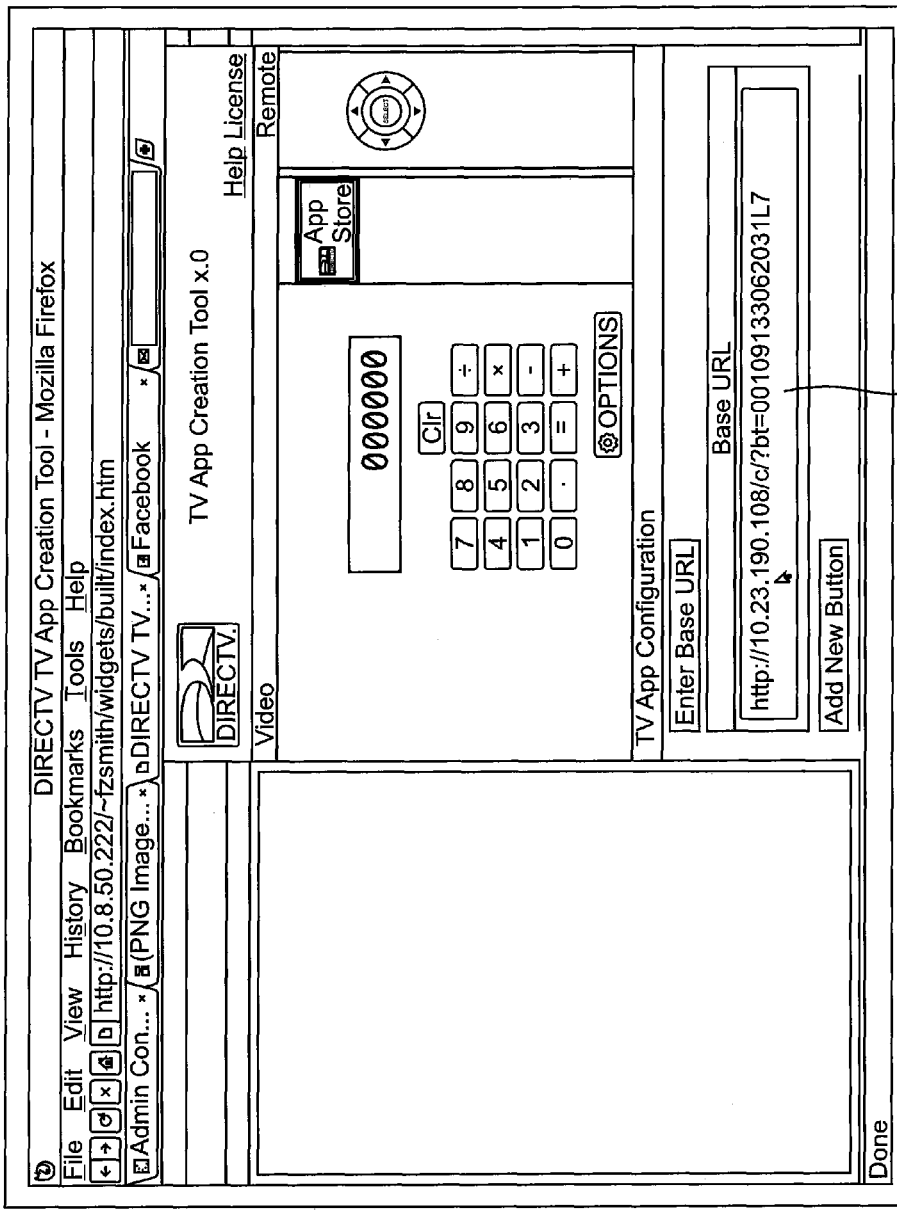

FIG. 7 illustrates code generation in accordance with one or more embodiments of the present invention.

As button definition screen 600 is populated by the creator of the overlay application, and the definitions of the areas within image 400 are defined and payloads 604 and functions 602 are completed for image 400, admin program 308 generates computer code, called button definition code, that appears in the button definition code 700 portion of section 500.

Figure 8:
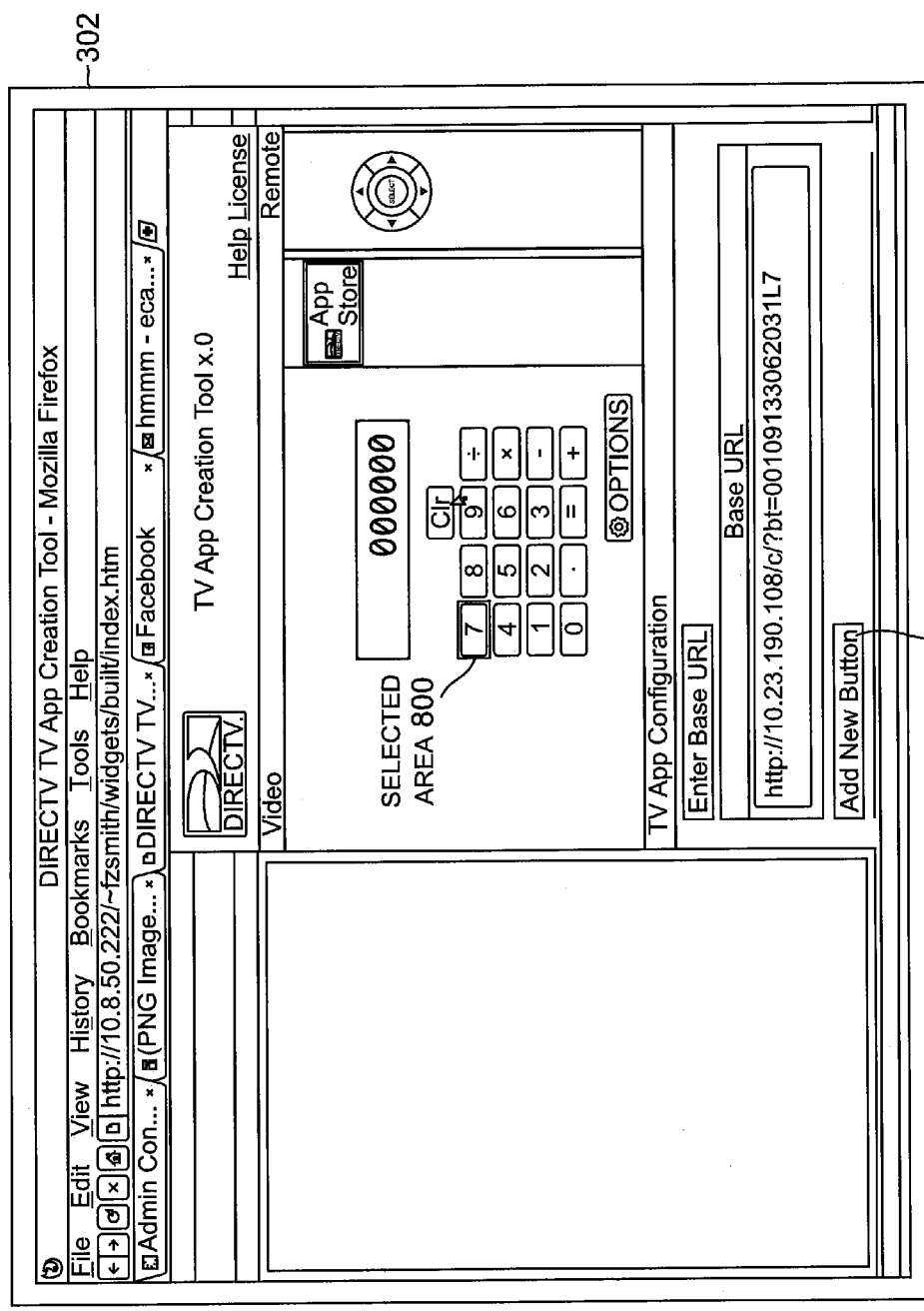

FIG. 8 illustrates completion of a button definition in accordance with one or more embodiments of the present invention.

Once button definition screen 600 is fully populated and defined, admin program 308 defines a selected area 800 which is indicated to the creator/user of the overlay application by a cursor or other visual indicator, as to the dimensions of the selected area on image 400. For each area selected in image 400, the user populates and saves button definition screen 600, and goes on to create additional buttons and adds code to button definition screen 600 through selection of the add button selector 802. Once all buttons/areas 800 are defined for the selected image 400, the user/creator then saves the entire overlay application when the final area 800 is defined.

Once all of the areas within image 400 are properly defined, and the creator wishes to make the final overlay application available to others, the button definition code in code 700 portion is saved on computer 300 and/or sent to overlay application data source 113. Overlay application data source 113, which, in the present example, is a third-party storage facility but can also be stored directly on IRD 130, is accessible via selection of icon 504, to upload the created overlay application such that the overlay application is available to other users.

Such uploading of the created overlay application can be controlled by the system 100 provider, such that any created overlay applications meet legal, technical, security, and other standards placed on system 100 provider, or meet any other scrutiny that system 100 provider may choose to place on user-created or third-party created overlay applications.

Displaying Applications

Figure 9:
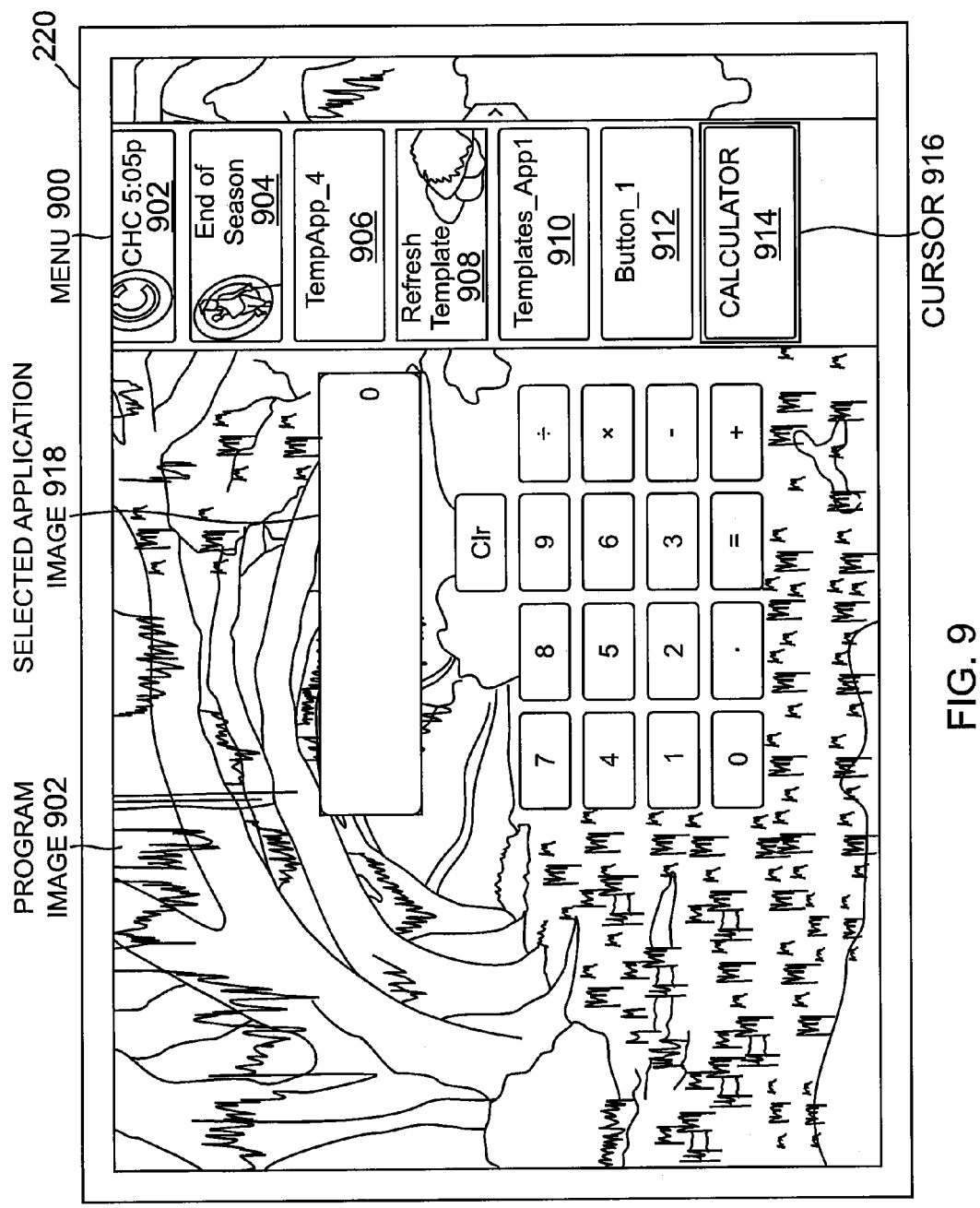
FIGS. 9-10 illustrate display of the created overlay applications on a monitor in accordance with one or more embodiments of the present invention.
Figure 10:
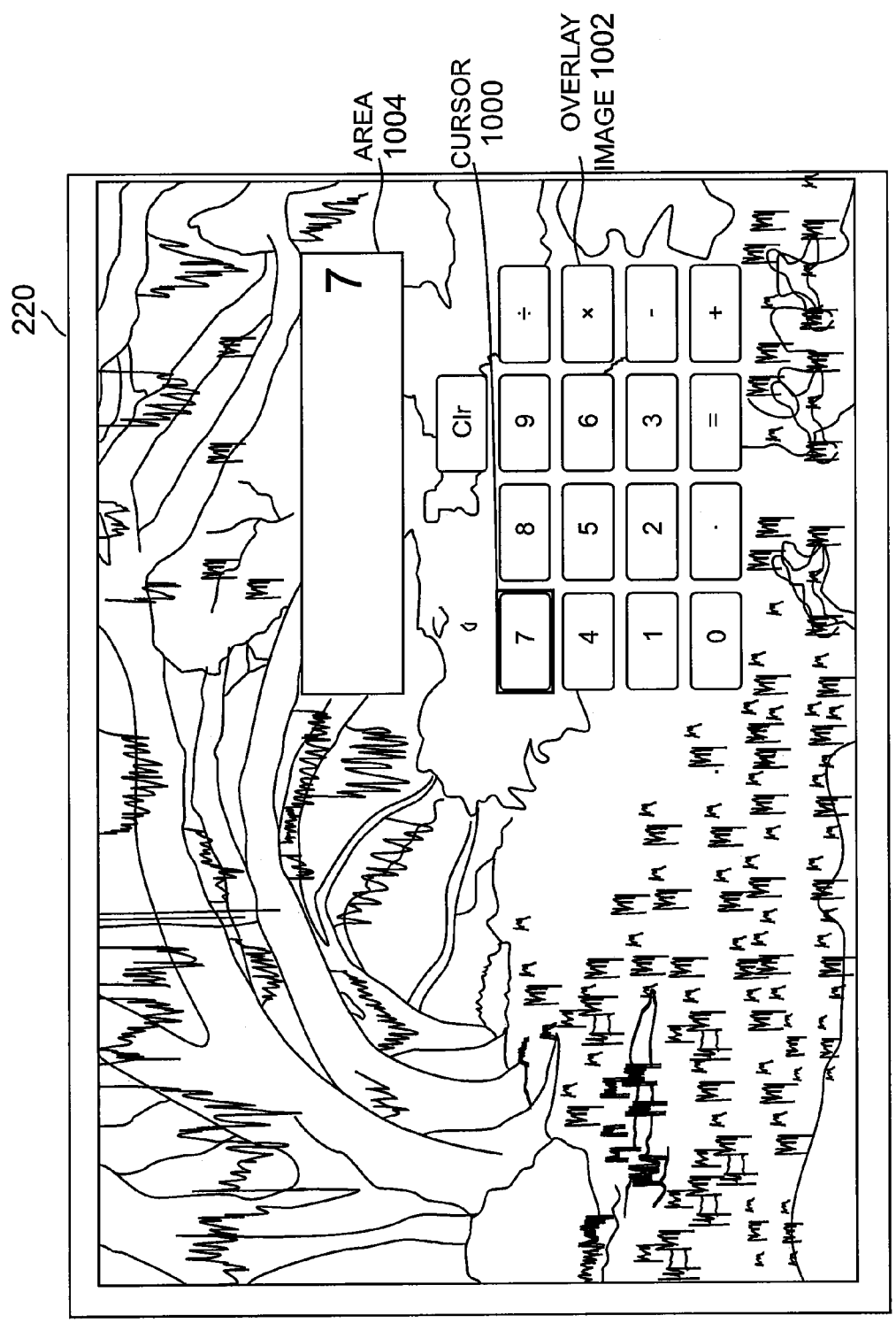
Figure 11:
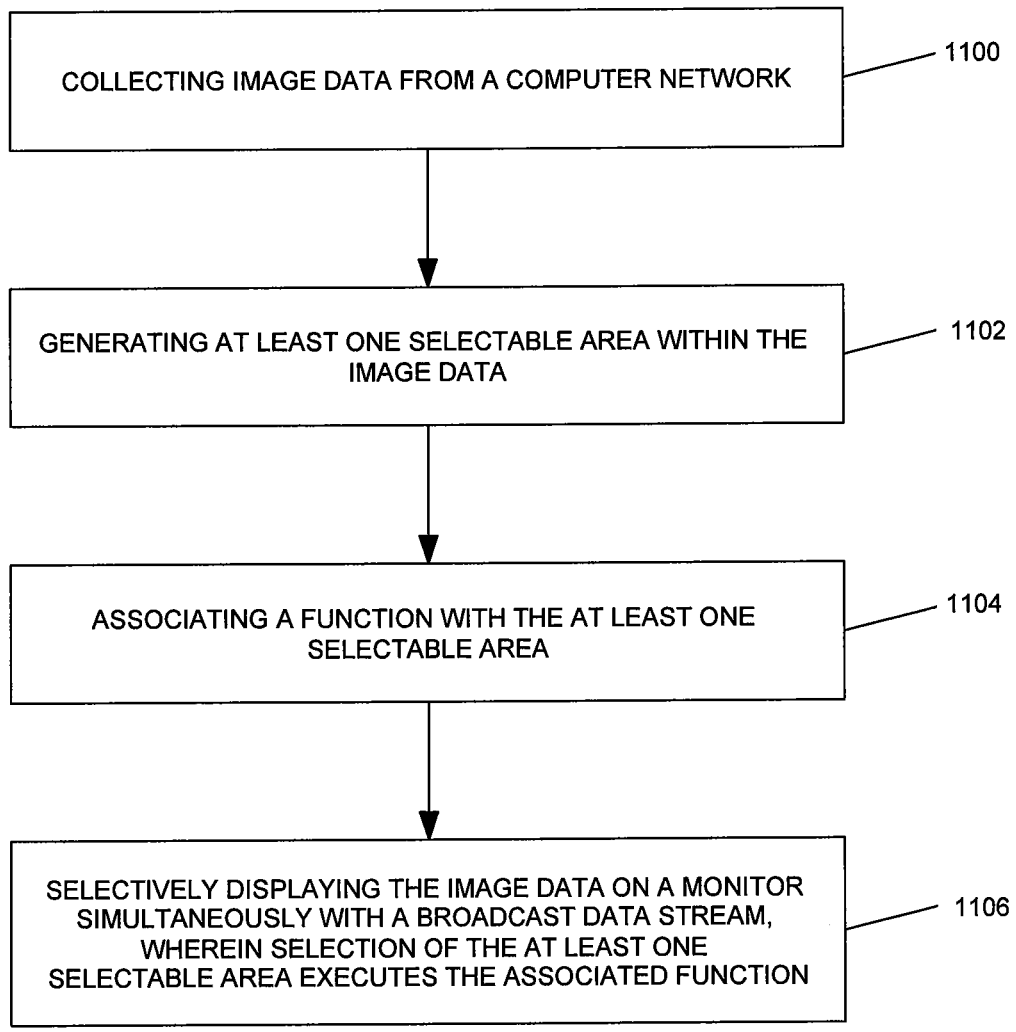
FIG. 11 is a process chart in accordance with one or more embodiments of the present invention.

FIGS. 9-11 illustrate display of the created overlay applications on a monitor in accordance with one or more embodiments of the present invention.

FIG. 9 illustrates display device 220 when overlay application controller 240 is running in parallel with reception of programs from program source 108 or other programming displayed on display device 220.

Overlay application controller 240 displays a menu 900, also known as dock 900, which displays one or more selections that can be chosen by a viewer. Through use of the remote control cursor (or other) keys, the dock 900 can be selectively displayed along with program image 902 (which is the web image, data stream, or video stream 400) and different overlay applications 904-914 can be selected. Cursor 916 is displayed on selected overlay application 914, and cursor 916 can be moved within menu 900 through the use of the cursor keys on the remote control associated with IRD 130, or through other means as desired.

As cursor 916 is moved within menu 900, the selected overlay application, in this example, application 914, can, if desired, display a selected application image 918, which is the image 400 selected as described above. When the desired overlay application is marked by cursor 916, e.g., when cursor 916 is on the overlay application 904-914 that the viewer wishes to use, the viewer can then select (via the select button on the remote control or by other methods) the overlay application 904-914. So, for example, once the cursor 916 is on the "calculator" overlay application 914, and the viewer selects that overlay application 914, the IRD 130 makes a call to overlay application data source 113 to retrieve image 400.

FIG. 10 illustrates selection of an overlay application in accordance with one or more embodiments of the present invention.

After selection, menu 900 can be removed from display device 220, i.e., selectively not displayed once the overlay application 904-914 if that is the desire of the creator/viewer, and now the cursor keys and other remote control keys will be operable on the defined areas of the overlay application. So, for example, once the calculator overlay application 914 is selected, the cursor and other keys will now operate on the defined buttons that were defined with button definition screen 600. As the user moves cursor 1000 on the image 1002 of overlay application 914, and selects a given area on the image of overlay application 914, the function 602/payload 604 are activated through overlay application controller 240, which then performs the function 602/payload 604 associated with that given selected area. For example, when the user places cursor 1000 on the "7" portion of the image 1002, the function 602 associated with that selection, namely, to call a new URL image of a "7" and display that image of a "7" on image 1002 in area 1004, is performed. Selection of other portions of image 1002 will then cause overlay application controller 240 to perform those associated functions 602/payloads 604 associated with those areas such that additional webpages or URLs are called by overlay application controller 240.

As such, each cursor 1000 movement and area selection of defined areas 800 appears, on display device 220, to be interactive and running on IRD 130, although cursor 1000 movement and selection of defined areas 800 are calling additional URLs and/or performing functions within IRD 130 through the use of the remote control associated with IRD 130 and overlay application controller 240.

As described above, the contents of the overlay applications may be updated periodically, continuously, or only at times when changes in the information related to the overlay applications are selected or present on menu 900. As an example, an overlay application 904 that is related to weather, which is constantly changing, may be updated every five to ten minutes, by a call to a URL by overlay application controller 240 without selection from cursor 1000. In some examples, the information related to an overlay may not change for a significant period of time and, in such a case, the overlay application may not execute for that dormant time period. For example, because trading markets are open during a portion of the day, an overlay application that displays a stock ticker may only update its information during a portion of the day. Specifically, a stock ticker overlay application may include one mode of operation that enables a receipt of data and another dormant mode of operation (i.e., where data cannot be received). This may free up processing capabilities and bandwidth that would otherwise be wasted.

As described above, the overlay applications and the associated features or characteristics thereof may be linked to and/or tracked by a user account.

In some examples, different users may share any overlay applications they have created by uploading them to a database (e.g., at the overlay application data source 113) for other users of a similar system to download. The list of available overlay applications may also include those created by a third party (e.g., a content provider). For example, the entity responsible for providing a certain game show may create an overlay application that presents a program-related trivia game, a countdown to a next episode, a news ticker regarding the program (e.g., the winner or prize won of the last episode), or an overlay application that is synced with a broadcast of the program to correspond with events of each episode. In some examples, a manufacturer of a component of the media presentation system (e.g., the IRD 130) may design and/or create a troubleshooting overlay application or a overlay application to notify users of available upgrades or other products (e.g., advertisements). Additionally or alternatively, the overlay applications may incorporate advertisements. For example, where a user has set multiple overlays to toggle or cycle, an advertisement may be interjected into the cycle or progression of overlays. Some example overlay applications may be solely dedicated to advertisements, which may cycle and update according to newly available products or sales thereof.

Process Chart

FIG. 11 is a process chart illustrating an embodiment of the present invention.

Box 1100 illustrates collecting image data from a computer network.

Box 1102 illustrates generating at least one selectable area within the image data.

Box 1104 illustrates associating a function with the at least one selectable area.

Box 1106 illustrates selectively displaying the image data on a monitor simultaneously with a broadcast data stream, wherein selection of the at least one selectable area executes the associated function.

CONCLUSION

The systems, apparatuses, and methods described above are non-limiting examples. Although the example apparatus and methods described herein include, among other components, software executed on hardware, such apparatus and methods are merely illustrative and should not be considered as limiting. Although shown as specific screens or display images, other display images or computer user interfaces can be used without departing from the scope of the present invention.

The present invention describes methods, apparatuses, and systems for creating an overlay application for use within a broadcast communications system. A method in accordance with one or more embodiments of the present invention comprises collecting image data from a computer network, generating at least one selectable area within the image data, associating a function with the at least one selectable area, and selectively displaying the image data on a monitor simultaneously with a broadcast data stream, wherein selection of the at least one selectable area executes the associated function.

Such a method further optionally comprises the associated function comprising retrieving a new image data from the computer network, saving the image data and associated function as an application in a publicly accessible database, restricting access to the saved image data and associated function, and the associated function comprising performing a function on a set-top box.

An apparatus for displaying a broadcast data stream and a user-created overlay application on a monitor in a broadcast communications system in accordance with one or more embodiments of the present invention comprises a receiver, an overlay application controller, coupled to the receiver, a storage device, coupled to the overlay application controller and the receiver, a network interface, coupled to the controller and the receiver, and a user interface, coupled to the controller, wherein at least one user-created overlay application is selected via the user interface, the at least one user-created overlay application comprising image data selected from a computer network and a function associated with at least one selectable area within the image data, wherein the at least one user-created overlay application is selectively displayed simultaneously with the broadcast data stream on the monitor.

Such a system further optionally comprises the associated function comprises retrieving a new image data from the computer network, saving the image data and associated function as an application in a publicly accessible database, restricting access to the saved image data and associated function, the associated function comprising performing a function on a set-top box, the user-created overlay application being created on a computer, and the user-created overlay application being created on a user account associated with the broadcast communication system.

A system for displaying a broadcast data stream and a user-created overlay application on a monitor in a broadcast communications system in accordance with one or more embodiments of the present invention comprises a transmission system for transmitting a plurality of broadcast data streams, a network interface, a receiver for receiving the plurality of broadcast data streams from the transmission system and at least one user-created overlay application from the network interface, an overlay application controller, coupled to the receiver, for executing the plurality of user-created overlay applications, and a user interface, coupled to the receiver, wherein at least one user-created overlay application is selected via the user interface, the at least one user-created overlay application comprising image data selected from a computer network and a function associated with at least one selectable area within the image data, wherein the at least one user-created overlay application is selectively displayed simultaneously with the broadcast data stream on the monitor.

Such a system further optionally comprises the associated function comprising retrieving a new image data from the computer network, saving the image data and associated function as an application in a publicly accessible database, restricting access to the saved image data and associated function, and the associated function comprising performing a function on a set-top box.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims appended hereto and the full range of equivalents to the claims appended hereto.

What is claimed is:

1. An apparatus for displaying a broadcast data stream and a user-created overlay application on a monitor in a broadcast communications system, comprising:
    a receiver;
    an overlay application controller, coupled to the receiver;
    a storage device, coupled to the overlay application controller and the receiver;
    a network interface, coupled to the controller and the receiver; and
    a user interface, coupled to the controller, wherein:
        the user interface comprises a menu for selecting at least one user-created overlay application, wherein the menu is overlaid simultaneously with the broadcast data stream on the monitor, wherein the broadcast data stream is received via satellite;
        the at least one user-created overlay application comprises image data selected from a computer network and a function associated with at least one selectable area within the image data;
        in response to the selecting, in the menu, of the at least one user-created overlay application, the at least one user-created overlay application is overlaid simultaneously with the broadcast data stream on the monitor; and
        in response to selecting the at least one selectable area within the image data that is overlaid, the overlay application controller performs the function associated with the at least.

2. The apparatus of claim 1, wherein the associated function comprises retrieving a new image data from the computer network.

3. The apparatus of claim 2, further comprising saving the image data and associated function as an application in a publicly accessible database.

4. The apparatus of claim 3, further comprising restricting access to the saved image data and associated function.

5. The apparatus of claim 1, wherein the associated function comprises performing a function on a set-top box.

6. The apparatus of claim 1, wherein the user-created overlay application is created on a computer.

7. The apparatus of claim 6, wherein the user-created overlay application is created on a user account associated with the broadcast communication system.

8. A system for displaying a broadcast data stream and a user-created overlay application on a monitor in a broadcast communications system, comprising:
    a network interface;
    a receiver for receiving, via satellite, the plurality of broadcast data streams from the transmission system and at least one user-created overlay application from the network interface;
    an overlay application controller, coupled to the receiver, for executing the plurality of user-created overlay applications; and
    a user interface, coupled to the receiver, wherein:
        at least one user-created overlay application is selected via a menu of the user interface;
        the menu is overlaid simultaneously with the broadcast data stream;
        the at least one user-created overlay application comprises image data selected from a computer network and a function associated with at least one selectable area within the image data; and
        in response to the selection via the menu, the at least one user-created overlay application is overlaid simultaneously with the broadcast data stream on the monitor.

9. The system of claim 8, wherein the associated function comprises retrieving a new image data from the computer network.

10. The system of claim 9, further comprising saving the image data and associated function as an application in a publicly accessible database.

11. The system of claim 10, further comprising restricting access to the saved image data and associated function.

12. The system of claim 9, wherein the associated function comprises performing a function on a set-top box.

* * * * *